INVENTORS
KENNETH S. NORRIS
ROLLIN C. JOHNSON
BY
AGENT

INVENTORS
KENNETH S. NORRIS
ROLLIN C. JOHNSON
BY

AGENT

July 6, 1965  K. S. NORRIS ETAL  3,192,915
APPARATUS FOR PROJECTING ANIMAL FOOD
Filed May 28, 1962  5 Sheets-Sheet 4

INVENTORS
KENNETH S. NORRIS
ROLLIN C. JOHNSON
BY Jack M. Miller
AGENT

July 6, 1965

K. S. NORRIS ET AL 3,192,915

APPARATUS FOR PROJECTING ANIMAL FOOD

Filed May 28, 1962

INVENTOR.
KENNETH S. NORRIS
ROLLIN C. JOHNSON
BY

AGENT

United States Patent Office 3,192,915
Patented July 6, 1965

3,192,915
APPARATUS FOR PROJECTING ANIMAL FOOD
Kenneth S. Norris, 5 Fruit Tree Road, Portuguese Bend, Calif., and Rollin C. Johnson, 2931 McCall St., San Diego, Calif.
Filed May 28, 1962, Ser. No. 198,028
15 Claims. (Cl. 124—11)

This invention relates generally to a method and apparatus for feeding animals, and in particular, to a food gun for shooting food to animals in zoos, aquariums, and recreation areas.

The feeding of animals in both nature and captivity is a favorite pastime of the animal enthusiast. However, suitable comestibles for animal consumption are typically messy, odiferous, and inconvenient to handle. Most foods do not structurally lend themselves to hand throwing for the distances required and, as a result, hand-thrown foods usually fall short of the animals being fed. The hand throwing of food is also awkward, wasteful, and unsanitary. A further problem arises from the human diseases, e.g., virus diseases, measles, tuberculosis, pneumonia, and the like, transmitted to animals by food which is handle by humans prior to feeding in the typical zoo or aquarium environment. Many such public animal homes have rules against public feeding, thus attempting to insure appropriate types and quantities of uncontaminated food for the captive creatures and to minimize animal illness. A further problem in the public display of animals is the required removal of an animal from exhibition in order to control feeding and administer therapeutic drugs. Sick animals, when subjected to the promiscuous feeding of the lay public, rapidly decline and often die.

It is accordingly an object of this invention to provide an improved animal feeding method and particularly, a method suitable to the public feeding of captive animals.

Another object of this invention is to provide a food gun for the public feeding of animals, particularly those living in zoos and aquariums.

A further object of this invention is to provide a food gun which is rugged, convenient to service and use, and easy to maintain.

Other and related objects will be apparent from the detailed description of the invention and various advantages not specifically referred to herein will be apparent to those skilled in the art on employment of the invention in practice.

We have now found that the foregoing objects and their attendant advantages can be particularly realized in an animal feeding method wherein the food is shaped as a projectile, the food projectile is placed in a gun whose barrel is aimed towards an animal to be fed and whose barrel is usually tilted to provide the appropriate trajectory, and the food is ejected with suitable force to land in the vicinity of the animals. One embodiment of a food gun suitable for use in the animal feeding method of our invention comprises a barrel integrated with a projectile feeding device for moving food projectiles successively into register with the breech end of the barrel. The projectile feeding mechanism is adapted to provide only one projectile to a pneumatic firing mechanism with each trigger pull and the projectile case is positioned in such a manner that there is substantially no compressed air leak into the projectile feeding mechanism upon firing. Variations in projectile range are usually obtained by varying either, or both, the pressure of the compressed air supply and the projectile weight. The food gun is mounted on a gun mounting which is movably connected to a gun support cabinet. The gun mounting can be canted to obtain projectile trajectory and can be rotated or pivoted to obtain horizontal direction barrel alignment with the animal being fed. The gun support cabinet houses the reserve food projectiles for the food gun and, with perishable food projectiles, houses facilities for maintaining the food projectiles in a cool or refrigerated condition during storage prior to the feeding of the projectiles to the gun firing mechanism. The food projectiles are preferably fired by a blast of compressed air, but other propulsive techniques including mechanical devices such as springs can be used to furnish the projectile propelling force.

The improved animal feeding method and food gun of our invention can best be understood with reference to the accompanying drawings which form a part of this application, and wherein the same numerals are used to designate the same parts throughout the drawings.

It is to be understood that although the animal feeding methods and food guns of our invention are particularly applicable to feeding animals in captivity, our invention is broadly applicable to the feeding of any animal, wild or captive. Thus, although the feeding method and food gun are specifically described in connection with zoos and aquariums, the techniques and food guns can be used to feed wild aquatic animals such as seals, porpoises and the like from the shore or from shipboard, and also can be used to feed wild birds, grounded or flying, as well as wild animals such as deer and bear in parks and animal sanctuaries. Furthermore, although described specifically as a gun herein, our invention can be camouflaged in other forms where, for esthetic or psychological reasons, it is desired that our feeding device not have the appearance of a firearm.

Referring now more particularly to FIGURES 1, 2, 3 and 4, the gun assembly there shown comprises food gun 2 mounted on gun support cabinet 10 by means of gun mounting 4. Gun support cabinet 10 is a rectangular metal box having gun support cabinet door 12 which is illustrated in the open position in FIGURE 1. Open door 12 reveals food storage cabinet 14 mounted within gun support cabinet 10 which is shown with open food storage cabinet door 16. Food storage cabinet 14, an aluminum cabinet covered with insulation 18, has screened opening 20 which opens into the interior space of gun support cabinet 10 not occupied by food storage cabinet 14. Screened opening 20 is located on the side of food storage cabinet 14 opposite door 16.

Figures 1, 2, 3, 4, 19, 20, 21:
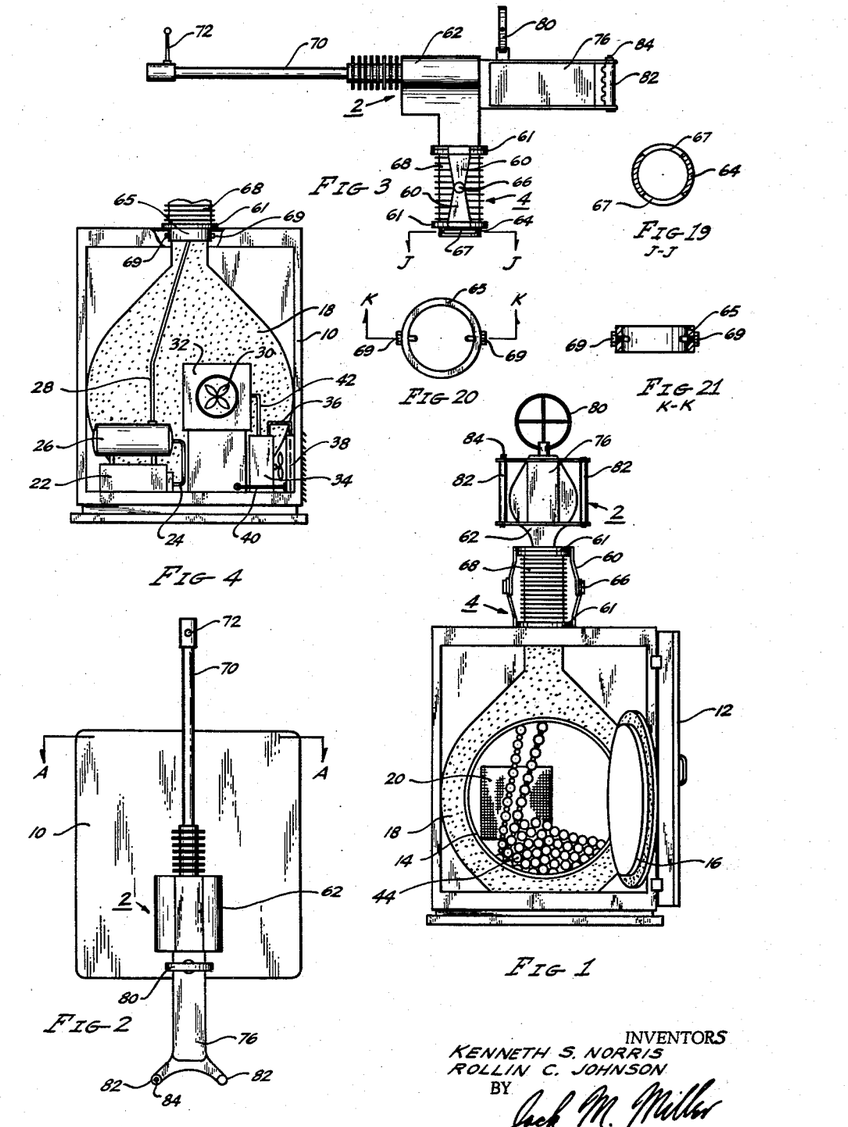
FIGURE 1 is a rear view of the food gun of this invention mounted on a gun support cabinet which is illustrated with the door open thus revealing a food storage cabinet housed within.
FIGURE 2 is a plan view of the food gun and gun support cabinet shown in FIGURE 1 except the gun support cabinet door is closed.
FIGURE 3 is a side view of the food gun and mounting shown in FIGURE 1.
FIGURE 4 is a view in cross-section taken on line A—A of FIGURE 2 showing the air compressor and refrigeration unit mounted within the gun support cabinet.
FIGURE 19 is an enlarged view in cross-section taken on line J—J of FIGURE 3.
FIGURE 20 is an enlarged plan view of the base ring for the swivel mount shown in FIGURE 4.
FIGURE 21 is a view in cross-section taken on line K—K of FIGURE 20.

FIGURE 4, taken along section A—A of FIGURE 2, shows the side panel removed from the vertical side of gun support cabinet 10 opposite from the side comprising gun support cabinet door 12. Mounted in this exposed space of gun support cabinet 10 is the air compression and refrigeration equipment used in this embodiment of our invention. Food storage cabinet 14 receives refrigerated air, when required for the preservation of the food projectiles in food transport belt 44, by means of fan 30 which blows air through refrigeration coil 32 and screen 20 into food storage cabinet 14. A small amount of cold air usually passes upward through food storage cabinet 14 and flexible guide 92, located within bellows 68, into forward gun housing 62. This upward flow of air is low in volume, but usually is sufficient to maintain projectiles 49 in food transport belt 44 cool until fired. Of course, by allowing an increased amount of cool air to escape from gun housings 62 and 76 the quantity of refrigeration can be increased within bellows 68 and forward gun housing 62. This added refrigeration can thus permit the use of highly perishable comestibles for forming projectiles 49. Conventional motor-compressor refrigeration unit 34, connected to a suitable source of electrical energy, furnishes the refrigerant for cooling via hot refrigerant line 36, forced air condenser 38, and cool refrigerant line 40 which is connected to an expansion valve (not shown) incorporated with refrigeration coil 32. Refrigerant suction line 42 conducts expanded refrigerant back to motor-compressor refrigeration unit 34 from refrigeration coil 32. Motor-compressor refrigeration unit 34 has conventional refrigeration controls for adjusting and controlling the temperature in food storage cabinet 14 at the appropriate temperature for the food comprising projectiles 49. Of course, when food gun 2 fires foods such as cereals, etc., refrigeration is not required and motor-compressor refrigeration unit 34 is not used.

Also shown in FIGURE 4 is motor-air compressor unit 22 whose motor is connected to a suitable source of electrical energy and whose compressor is connected by compressed air conduit 24 to pressure tank 26. Pressure tank 26 is connected to air solenoid valve 78, located in rear gun housing 76, by flexible air conduit 28 which passes upward from gun support cabinet 10 through bellows 68 to forward gun housing 62 and thence to air solenoid valve 78. Air solenoid valve 78, connected to breech adapter 106 by air conduit 108, is closed when its solenoid coil 447 is not energized and valve 78 is opened when solenoid coil 447 is energized by the firing control circuitry hereinafter described in relation to FIGURE 22 (control circuit schematic). It is to be understood that while air is the preferred compressed gas for use in the food gun of this invention, any compressed gas is satisfactory such as carbon dioxide, nitrogen, and the like. Furthermore, although an air compressor system is illustrated in the drawings as the source of compressed gas, any other suitable source such as a storage tank supply is satisfactory. The pressure of pressure tank 26 is controlled by conventional controls at an adjustable pressure, usually about 30 to 80 p.s.i.g. The selection of the appropriate air pressures for pressure tank 26 is controlled primarily by the desired projectile velocity.

Figure 9:
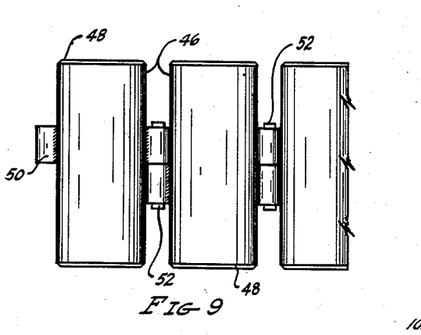
FIGURE 9 is an enlarged plan view of a portion of the food transport belt shown in FIGURE 1.
Figure 10:
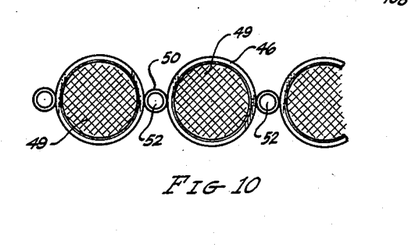
FIGURE 10 is an end view of the food transport belt shown in FIGURE 9.

Food transport belt 44, shown in FIGURE 1, is a continuous food projectile carrier which is illustrated in detail in FIGURE 9 and FIGURE 10. Food transport belt 44 comprises cylindrical shells 46 with chamfered ends 48 having tubular connectors 50 connected at each end of an outer surface diameter of each shell 46. Tubular connectors 50 for adjacent shells 46 in food transport belt 44 are connected by means of cotter pins 52 which pivotally connects each shell 46 to the next shell 46. Enough flexibility should be provided in this connection to permit food transport belt 44 to flex with gun aiming and not to bind as food transport belt 44 is engaged by sprocket assembly 90, shown in FIGURE 5 and FIGURE 6. Thus, cotter pins 52 should be installed in a manner which neither restricts the flexibility of food transport belt 44 nor prevents play between the longitudinal axis of adjacent shells 46.

Shells 46 are normally filled with a comestible or food in any suitable manner which provides a projectile 49 having sufficient strength to maintain its integrity upon being fired from food gun 2. Food projectile 49 should not project past the ends of shell 46 when shell 46 is loaded and ready for firing. For example, cooked or raw and frozen or unfrozen whole fish or fish chunks or parts can be frozen in shell 46 or packed into shell 46 to form projectile 49, particularly when aquatic animals are being fed. Other meats, either cooked or raw, can also be frozen or otherwise processed to form projectile 49 depending on the animal to be fed. Also, an encased food or meat, either frozen or unfrozen, such as weiners, sausages, and the like can be used for projectile 49. Also, any food material can be combined with gelatins, thickeners, food binders, and the like to form a satisfactory projectile 49. Furthermore, peanuts or grains such as whole kernel corn, rye, wheat, barley, oats, and the like can be consolidated, encased in a sack or casing, or otherwise processed to form projectile 49. A further method of forming projectile 49 is to mix a dough or paste of suitable food or bread materials and bake projectile 49 within shell 46. Alternately, projectile 49 is baked in a separate mold and the baked projectile placed within shell 46, either with or without a surface binder to retain the baked projectile 49 within shell 46 during handling. Any and all of the above-mentioned foods can also be compounded with dietary supplements such as vitamins and/or medicines such as tranquilizers, antibiotics, and the like in forming projectiles 49. The choice of food for projectile 49 depends primarily upon the fish tank or animal display in front of which it is mounted, and such food can include those foods above-mentioned as well as any other suitable animal food which preferably has been processed to hold together when fired from barrel 70. However, with some animals such as birds it can be desirable to have a certain amount of projectile disintegration in flight, and in these cases special projectiles 49 are prepared which partially break-up when fired from food gun 2.

The gun is connected to gun support cabinet 10 by means of gun mount 4 comprising hinges 60 which at their upper ends attach to flange 61 on forward gun housing 62 and attach at their bottom ends to flange 61 on swivel mounting 64. Swivel mounting 64 sets into base ring 65 in the top of gun support cabinet 10 as illustrated in the cut-away portion at the top of gun support cabinet 10 in FIGURE 4. Hinges 60 pivot centrally at rotatable hinge joint 66 to provide vertical alignment of food gun 2 for aiming. Bellows 68 tends to limit elevation on food gun 2 and further acts as a spring which tends to counteract the tendency of the muzzle of gun barrel 70 to drop when food gun 2 is not in use. This barrel dropping tendency is a function of the forward center of gravity of food gun 2 in relation to the vertical axis of gun mounting 4. Bellows 68 further protects the control wiring and flexible air conduit 28 running from the gun support cabinet 10 up to food gun 2 and further protects flexible guide 92 which has food transport belt 44 passing through it. Bellows 68 snaps into place in the recesses provided in flanges 61 located at the top and bottom of gun mounting 4. Stainless steel is usually used for the construction of bellows 68, but other materials are satisfactory such as rubber, neoprene, sheet metals, and the like.

Rotatable swivel mounting 64, shown in FIGURES 3 and 19, pivots in a horizontal plane to provide horizontal alignment of the gun while aiming and is provided with internal stops to limit the horizontal swing of the gun. The elements of the swivel assembly comprise swivel mounting 64 having elongated slots 67 and base ring 65. Swivel mounting 64 fits snugly into base ring 65 which is mounted in the top of gun support cabinet 10 shown in FIGURE 4. Base ring 65, shown in detail in FIGURE 20 and FIGURE 21, has two bolts 69 screwed into its walls. The extremities of bolts 69 are not threaded and project through the slots 67 of swivel mounting 64 when mounting 4 is completely assembled. Bolts 69 support the vertical load of food gun 2 and gun mounting 4. Also, bolts 69, in combination with slots 67, limit the horizontal travel or rotation of mounting 4 thus acting as internal stops. To assemble the swivel mounting, bolts 69 are removed from ring 65, swivel mounting 64 is inserted into ring 65, slots 67 are lined up with the bolt holes for bolts 69, and bolts 69 are screwed into place with their end portions projecting through slots 67.

Food gun 2 comprises a breech-loading gun barrel 70 attached to forward gun housing 62. Barrel 70 is decorated to resemble a machine gun or automatic rifle barrel and has front post sight 72 attached at the muzzle end for aiming. Forward gun housing 62, housing the food transport belt 44 positioning mechanism for aligning each shell 46 with barrel 70, is connected to gun support cabinet 10 by means of flanges 61, hinges 60, and swivel mounting 64, as previously described. Attached to rear wall 105 of forward gun housing 62 is rear gun housing 76 which houses air solenoid valve 78. Mounted on top of rear gun housing 76 is rear ring sight 80 which in combination with front post sight 72 provides aiming of gun barrel 70 of food gun 2. Attached to the rear of rear gun housing 76 are handles 82. Mounted on top of one of handles 82 is trigger switch 84 which electrically actuates (see FIGURE 22) the firing mechanism and the loading sequence for each shell 46 containing a projectile 49.

Figure 5:
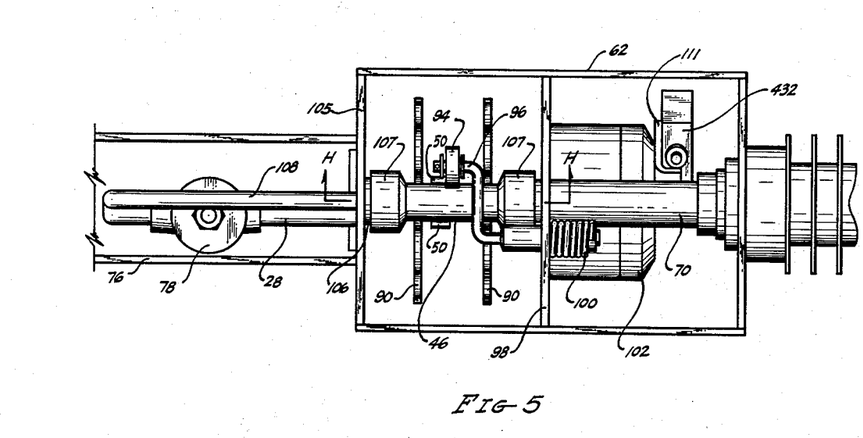
FIGURE 5 is an enlarged partial plan view of the food gun shown in FIGURE 2 with the top portion of the gun housing removed.
Figure 6:
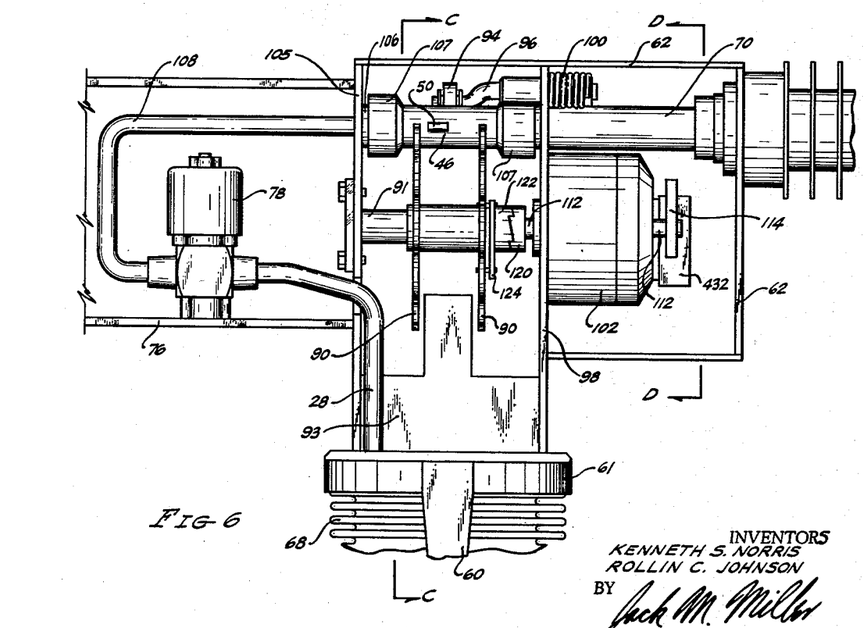
FIGURE 6 is an enlarged partial side view of the food gun and mounting shown in FIGURE 3 with the side portion of the gun housing removed.
Figure 7:
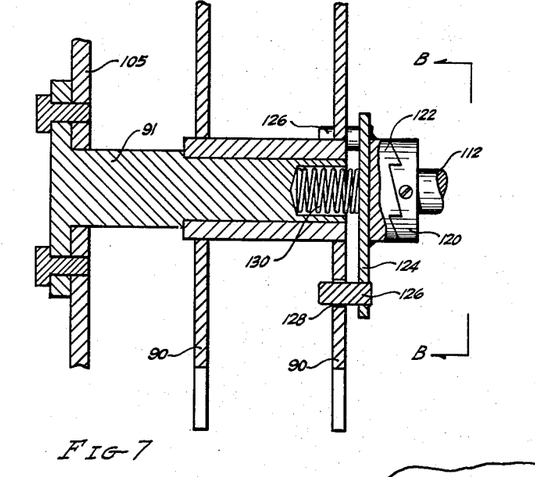
FIGURE 7 is an enlarged view in partial cross-section of the sprocket assembly shown in FIGURE 6.
Figure 8:
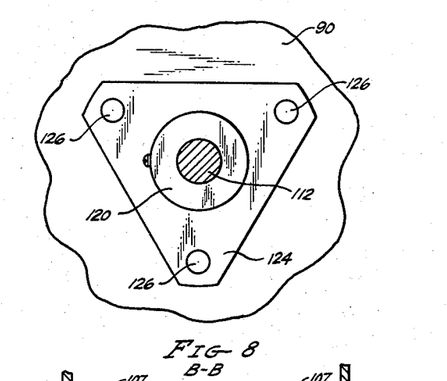
FIGURE 8 is a partial end view of the sprocket assembly taken on line B—B of FIGURE 7 particularly illustrating the triangular drive spider.
Figure 11:
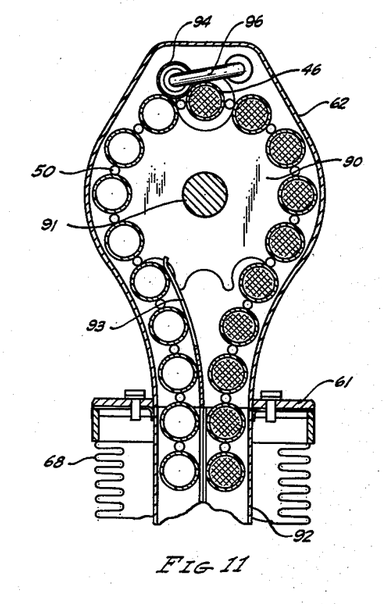
FIGURE 11 is a view in cross-section taken on line C—C of FIGURE 6.

Looking particularly at FIGURES 5, 6 and 11, sprocket assembly 90 is rotatably mounted within forward gun housing 62 on shaft 91 to drive each shell 46 of food transport belt 44 into firing position. Shaft 91 is fixedly mounted on rear wall 105 with its longitudinal axis parallel to the longitudinal axis of barrel 70. The sprockets of sprocket assembly 90 fit on shell 46 between the end of shell 46 and tubular connectors 50. Food transport belt 44 is conducted to and from sprocket 90 by flexible guide 92 whose upper and lower ends attach to flanges 61. Empty belt 44 is conducted away from the bottom of sprocket assembly 90 by the guiding action of flexible baffle guide 93 which is rigidly attached at its base to the bottom portion of forward gun housing 62. Each round (shell 46 containing projectile 49) is made ready for firing by the action of sprocket assembly 90 orienting or aligning each shell 46 of food transport belt 44 with the longitudinal axis of barrel 70 in combination with the registering action of ball bearing 94. The geometry of sprocket assembly 90, ball bearing 94, barrel 70, and breech caps 107 is such that the uppermost round of food transport belt 44 must fall into alignment with the longitudinal axis of barrel 70. Ball bearing 94 is mounted on Z-shaped shaft 96 which is rotatably mounted to transverse baffle 98. Spring 100 biases ball bearing 94 against adjacent shells 46 on food transport belt 44 by spring loading shaft 96. The spring-loaded ball bearing 94 also holds sprocket assembly 90 against rotation on shaft 91 when axially spring-loaded rotary solenoid 104 returns to its de-energized position.

Figure 18:
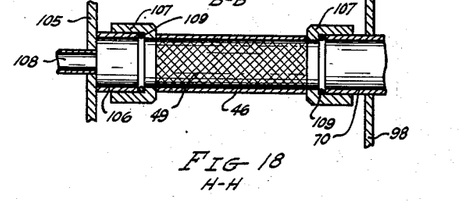
FIGURE 18 is an enlarged partial view in cross-section taken on line H—H of FIGURE 5.

Barrel 70 which passes into forward gun housing 62 and through transverse baffle 98, terminates at its breech end in a position which permits shells 46 of food transport belt 44 to register snugly with breech cap 107 which fits over the breech end of barrel 70 as shown in detail in FIGURE 18. O-ring 109, which serves as a cushion spring between breech cap 107 and the breech end of barrel 70, also acts as a pressure seal and provides the biasing pressure required to seal the end of shell 46 against breech cap 107. Likewise, breech adapter 106, having the same outside diameter as barrel 70, has a breech cap 107 fitting snugly onto it with an O-ring 109, in the same manner as with barrel 70, between breech cap 107 and the extremity of breech adapter 106. In line with the longitudinal axis of barrel 70, breech adapter 106 is mounted on the rear wall 105 of forward gun housing 62 and is in open fluid communication with air solenoid valve 78 via air conduit 108. Shell 46 moves into position between the two breech caps 107 which move slightly longitudinally to compress O rings 109 and thus seal and bias the mating surfaces of the ends of shell 46 against breech caps 107. Breech caps 107 are preferably made from brass, but other structural materials such as steel, Teflon and aluminum are satisfactory. Breech caps 107 can also be formed as sheet metal bellows, similar to bellows 68, thus providing a biasing action as a function of the inherent spring characteristics of the bellows.

Figure 12:
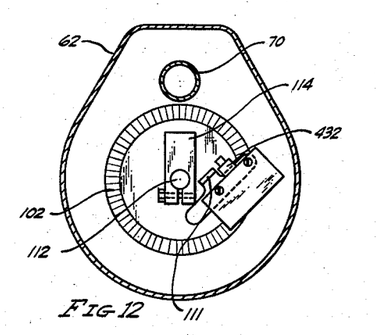
FIGURE 12 is a view in cross-section taken on line D—D of FIGURE 6.

Mounted on axially spring-loaded rotary solenoid 102, which is located in the rear portion of forward gun housing 62 as illustrated in FIGURES 5, 6, and 12, is counter advance switch 432 which activates shot counting stepper coil 420 as hereinafter described. Rotary solenoid 102 has a conventional internal mechanism which causes the linear solenoid stroke to produce a rotary motion of power output shaft 112. A preferred embodiment of rotary solenoid 102 rotates shaft 112 through an arc of about 30°. However, other arc strokes are operable and the arc required depends primarily on the overall geometry of the projectile positioning mechanism. Striker 114 is rigidly attached to the forward end of solenoid output shaft 112 and is so adjusted as to actuate spring-loaded counter advance switch 432 at the end of the drive stroke of rotary solenoid 102. Bracket 111 mounts counter advance switch 432 on the forward end of the housing of rotary solenoid 102. Bracket 111 also serves as a safety stop to prevent damage to the counter advance switch 432 should rotary solenoid 102 tend to overtravel.

Illustrated in FIGURES 5, 6, 7 and 8 is the spring loaded, ratcheted spider drive which transmits the drive torque of the solenoid, usually about 50 to 75 inch pounds, to sprocket assembly 90. Connected to the rear end of drive shaft 112 is drive ratchet gear 120. Drive ratchet gear 120 imparts the drive torque of rotary solenoid 102 to sprocket assembly 90 through the mechanism of triangular spider drive plate 124 which has mounted on it driven ratchet gear 122 which matches and is driven by ratchet gear 120. Spider drive plate 124 has three drive pins 126 which fit in sliding relationship into three matching holes 128 in the forward plate of sprocket assembly 90. A helical spring 130, fitting into a hole in the end of shaft 91, bears against spider drive plate 124. Thus, when drive ratchet gear 120 is driving driven ratchet gear 122, spring 130 is only partially compressed as illustrated. Then, when ratchet gear 120 reverses direction in preparation for loading the next round, i.e., when rotary solenoid 102 is de-energized by the release of relay 446, spring 130 is compressed and drive plate 124 moves toward sprocket assembly 90 by means of pins 126 sliding in holes 128, thus allowing the teeth of ratchet gears 120 and 122 to slip by each other. The ratchet is required since rotary solenoid 102 is reciprocating device, whereas sprocket assembly 90 must always advance food transport belt 44 in the same direction.

Figure 13:
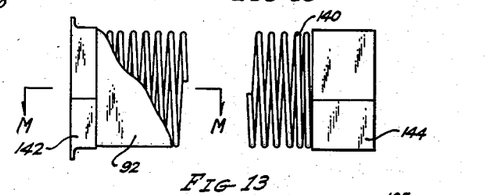
FIGURE 13 is a full view of the flexible food belt guide, shown in cross-section in FIGURE 11, wherein a portion of the plastic covering is removed.
Figure 14:
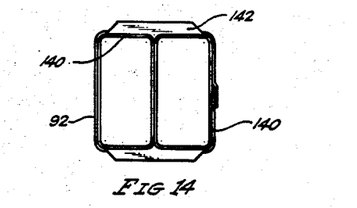
FIGURE 14 is an end view of the flexible food belt guide.
Figure 15:
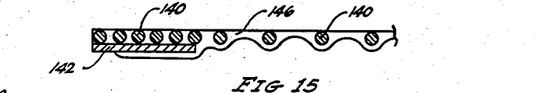
FIGURE 15 is an enlarged partial view of one outer wall of the flexible food belt guide taken on line M—M of FIGURE 13.

Flexible guide 92, illustrated particularly in FIGURES 13, 14 and 15 comprises two wound springs 140 which are shaped into a generally rectangular form, stretched to the proper length, welded together side by side and to end flanges 142 and 144, and coated with a plastic coating 146, e.g., polyvinyl, to form a flexible dual passage guide 92 for conducting loaded food transport belt 44 up to the firing position and conducting the empty food transport belt 44 back to food storage cabinet 14. Because of its elastic character, flexible guide 92 tends to center food gun 2 in elevation and azimuth when food gun 2 is elevated, depressed, or rotated.

Figure 22:
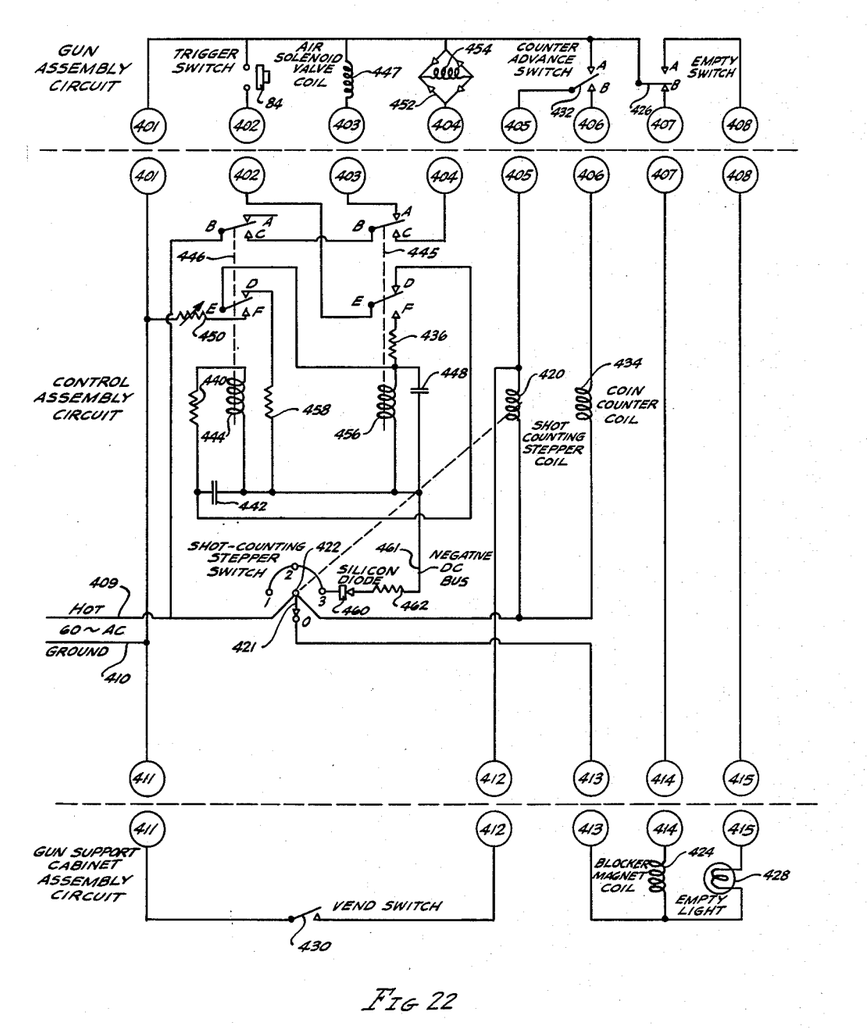
FIGURE 22 is a control circuit schematic illustrating the electrical functioning of the food gun assembly of this invention shown in FIGURES 1–21.

Control of the operation of the food gun device of this invention is illustrated schematically in FIGURE 22. Circuit and coin vending elements are conventional, and thus either are not illustrated or are illustrated only schematically. Circuit elements in the upper part of FIGURE 22 are those located in the food gun 2 assembly and circuit elements shown in the lower part of FIGURE 22 are those located in gun support cabinet 10 assembly. All circuit elements in the middle of FIGURE 22 are those which perform the counting, timing, proportioning, and protective functions and are contained in a closed control circuit element package located within gun support cabinet 10, this control circuit package being connected to the controlled gun 2 assembly and the gun support cabinet 10 assembly circuits by means of conventional plugs and cables. Numbers within circles in FIGURE 22 represent the pin numbers of conventional five-prong and eight-prong plugs and sockets that connect the control circuit package to the food gun 2 assembly circuits and gun support cabinet 10 assembly circuits. Operating electrical power, 110 volt 60 cycle alternating current, is supplied via hot A.C. electrical supply line 409 and ground A.C. electrical supply line 410. No coin credit has activated shot-counting stepper coil 420 as shown, therefore, the wiper arm 421 of shot-counting stepper switch 422 is at position 0. All elements in the schematic of FIGURE 22 are shown in their normally-unoperated, or ready positions. Blocker magnet coil 424 will be energized only if an alternating current supply is present on A.C. lines 409 and 410 and the food gun 2 assembly is ready for the coin vending elements to accept coins.

If food gun 2 is loaded, empty switch 426 is in position B as shown and permits current flow from ground A.C. line 410 through pin 401, empty switch 426, pin 407, pin 414, blocker magnet coil 424, pin 413, position 0 of short-counting stepper switch 422, and through wiper arm 421 of shot-counting stepper switch 422 to hot A.C. line 409. If food gun 2 is not loaded, i.e., no shell 46 in firing position, empty switch 426 is in position A, thus removing ground from blocked magnet coil 424 and applying ground to empty indicator lamp 428 via pin 408 and pin 415. When blocker magnet coil 424 is de-energized the slug rejector will not accept coins and coins are returned via a scavenger chute to the operator instead of being permitted to trip vend switch 430.

An accepted coin, i.e., when blocker magnet coil 424 is energized, momentarily closes vend switch 430 causing ground A.C. line 410 to be connected to shot-counting stepper coil 420 via pin 411, vend switch 430, and pin 412. Also, through pin 405, normally closed contact B of counter advance switch 432 and pin 406, ground A.C. line 410 is connected to coin counter coil 434. Since one coil terminal of both coin counter coil 434 and shot-counting stepper coil 420 is connected to hot A.C. line 409, both coils 420 and 434 are momentarily energized by the closing of vend switch 430. The passage of the coil is registered in the coin counter (not shown) and shot-counting stepper switch 422 advances one step putting wiper arm 421 at position 1. Current to blocker magnet coil 424 is cut off by the movement of wiper arm 421 from position 0 to position 1, and no coins can be accepted until wiper arm 421 returns to position 0. Because positions 1, 2, and 3 on shot-counting stepper switch 422 are connected together, the entire control circuitry for the food gun assembly is enabled through the action of silicon diode 460 providing energization of negative D.C. buss 461 when wiper arm 421 is in any of positions 1, 2 or 3.

To fire food gun 2 and start the loading sequence, trigger switch 84 is pressed which connects ground A.C. line 410 through pin 401, trigger switch 84, pin 402, and contacts E and D of relay 445 to the junction of resistor 40 and capacitor 442. The terminal of capacitor 442 opposite from resistor 440 is connected to the energized negative D.C. buss 461. Resistor 462 prevents excessive current flow through silicon diode 460 when capacitor 442 is connected for charging. Capacitor 442 charges without significant time delay and coil 444 closes relay 446 almost simultaneously to connect relay 446 contacts B to C and E to F. At the instant relay 446 operates, hot A.C. line 409 is connected via contacts B and C of relay 446, contacts B and A of relay 445, and pin 403 to coil 447 of air solenoid valve 78. When coil 447 of solenoid valve 78 is energized, valve 78 opens and air is passed from air pressure tank 26 via flexible air conduit 28, valve 78, and air conduit 108 to breech adapter 106 of food gun 2 to propel the food projectile 49 through barrel 70.

When relay 446 operates, ground A.C. line 410 is connected via resistor 450 and contacts E and F of relay 446 to capacitor 448 which charges at a rate controlled by resistor 450. Resistor 450 is adjustable to set the charging time of capacitor 448 in the range of 50 to 500 milli-seconds. This setting of resistor 450 controls the time during which air solenoid valve 78 is open. That is, when the voltage across capacitor 448 reaches the pull-in voltage of coil 456 of relay 445, contact B of relay 445 swings from contact A to contact C, thus removing hot alternating current from coil 447 of air solenoid valve 78 which allows it to close. Contact C of relay 445 now connects hot A.C. line 409, via contacts B and C of relay 446, to pin 404, thence to rectifier 452, energizing rotary solenoid coil 454 of rotary solenoid 102, thus rotating sprocket assembly 90 to load food gun 2 for the next firing sequence.

When A.C. ground is removed from the junction of capacitor 442 and resistor 440, capacitor 442 discharges through resistor 440 and coil 444, requiring approximately 750 to 900 milli-seconds for the voltage across coil 444 to fall below the hold-in voltage of relay 446. When relay 446 drops out, hot A.C. line 409 is disconnected from rectifier 452 and the operating mechanism of food gun 2 is de-energized both electrically and mechanically. When retifier 452 is no longer energized, rotary solenoid coil 454 is also de-energized and the axial spring loading of rotary solenoid 102 takes effect and reciprocates shaft 112 back through the arc stroke to the rest position. Should the gun operator continue to hold the trigger pressed, ground A.C. line 410 is connected to coil 456 of relay 445 via the contacts E and F of relay 445 and resistor 436. Resistors 436 and 458 form a voltage divider when relay 446 is not operated so that the voltage across coil 456 is two-thirds of the supply voltage from silicon diode 460, which voltage is sufficient to hold relay 445 operated while the trigger is pressed. Capacitor 442 cannot be recharged until relay 445 is allowed to drop out, which will occur about 100 milli-seconds after the trigger is released or after relay 446 drops out, whichever occurs later. When rotary solenoid 102 advances belt 44, counter advance switch 432 is operated by striker 114, thus connecting pin 405 to ground via contact A of counter advance switch 432. The shot-counting stepper switch 422 is advanced one step in consequence.

When wiper arm 421 of shot-counting stepper switch 422 is at position 3, the next operation of counter advance switch 432 steps wiper arm 421 to position 0 and the control circuitry is disabled until closure of vend switch 430 advances wiper arm 421 of shot-counting stepper switch 422 to position 1 again. A significant feature of this control circuitry is that the behavoir of the vulnerable parts; i.e., the rotary solenoid 102 control circuits, is independent of either the technique of the user or the completion of mechanical events associated with the action of food gun 2. A mechanical jamming of the gun mechanism does not prevent automatic removal of operating current from the actuating mechanism because current application depends solely upon the timing relations in the circuit of relay 446. Relay 446 must drop out if relay 445 is energized. The user can either press trigger switch 84 for the briefest possible interval or he can hold the trigger pressed indefinitely. In either event, the operating parts of food gun 2 complete their assigned cycle and are then disengaged electrically. Trigger switch 84 must be released and pressed for each shot fired. Of course, conventional firing control circuitry can also be used with food gun 2, and the coin vending feature can be eliminated if desired. When the activation of food gun 2 no longer depends on a coin being deposited, food gun 2 is then usually continuous firing, i.e., each trigger pull continually fires and reloads the gun without a delay for reactivation between shot sequences.

Figure 16:
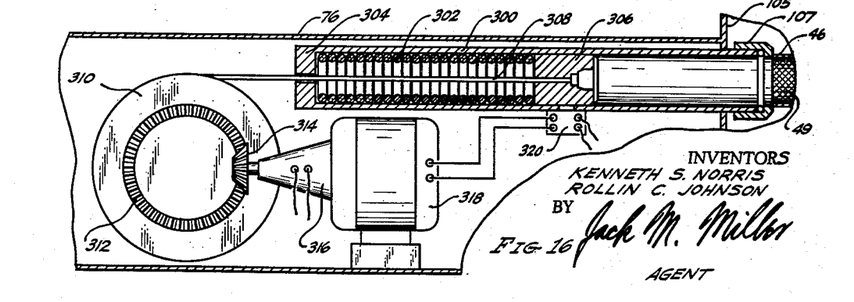
FIGURE 16 is a partial side view of a spring operated firing mechanism mounted in the rear gun housing shown in FIGURE 6 wherein the air solenoid valve is omitted and a spring propelling device substituted.
Figure 17:
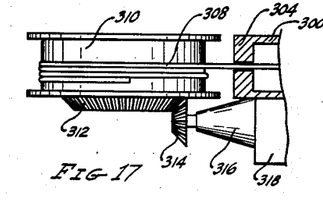
FIGURE 17 is a partial plan view of the spring operated firing mechanism of FIGURE 16.

A further embodiment of our invention is illustrated in FIGURES 16 and 17 wherein food gun 2 is utilized as previously described except for the pneumatic firing system. The size, shape, and functioning of all parts of food gun 2, mounting 4, gun support cabinet 10, and the electrical control circuits are the same as with the air operated gun previously described except that the pneumatic system is omitted and the spring device of FIGURES 16 and 17 is substituted therefor. Instead of air pressure, a spring launcher is utilized to eject projectiles 49 through barrel 70. The only modification to the previously described apparatus, except for the deletion of all of the pneumatic equipment and conventional adaptation of the control circuits of FIGURE 22, is illustrated mounted in rear gun housing 76.

Aligned with the longitudinal axis of barrel 70 and fixedly attached to breech adapter 106 at wall 105 is spring retaining cylinder 300 with helical firing spring 302 coiled around the inner wall of cylinder 300. Cylinder 300 has an inner diameter substantially identical to the inside diameter of breech adapter 106, shell 146, and barrel 70. Helical spring 302 is attached to baffle wall 304 at the rear end of cylinder 300 and, in the cocked position as shown, bears against lead slug 306 at its other end. Lead slug 306 is held compressed against spring 302 by cable 308 which is securely attached to lead slug 306. Cable 308 is centrally located in cylinder 300 and passes through an opening in the center of baffle 304 to cable drum 310. Cable drum 310 has cable 308 wound around it when food gun 2 is in the cocked position as shown, and the end of cable 308 is fixedly attached to the cylinder of cable drum 310. Attached to the side of cable drum 310 is driven bevel gear 312.

Driven bevel gear 312 is powered by drive bevel gear 314 which is connected to drive shaft 315 of electric motor 318. Electric motor 318 has conventional integral reduction gears and has an electrically activated clutch 316 which engages and disengages sections of drive shaft 315.

In the operation of the spring firing device of FIGURES 16 and 17, electric motor 318 drives cable drum 310 through driven bevel gear 312 and drive bevel gear 314 when clutch 316 is engaged (de-energized). Cable 308 wraps itself around drum 310, thus retracting lead slug 306 to the position shown which compresses spring 302. Limit switch 320 allows electrical power to be supplied to motor 318 until lead slug 306 is retracted to the position shown in FIGURE 16. When lead slug 306 is brought to the "cocked" position as illustrated, motor 318 is deactivated by the action of limit switch 320. Lead slug 306 is released by pressing trigger button switch 84 which is connected into the electrical circuit of electrically activated clutch 316. Pressing trigger button switch 84 causes the electrically activated clutch 316 to disengage (energized). When electrically activated clutch 316 disengages, cable drum 310 is released, thus releasing the restraining force of cable 308 on spring 302. The stored energy of spring 302 is released causing spring 302 to suddenly extend which violently accelerates lead slug 306. Accelerated lead slug 306 strikes and propels food projectile 49 through barrel 70, but cable 308 is of a length which prevents lead slug 306 from leaving barrel 70. Spring 302 thus imparts a sufficiently high initial thrust to lead slug 306 to overcome friction, strip cable 308 off drum 310, and launch food projectile 49. Limit switch 320 is also activated when lead slug 306 leaves the cocked position, and through a conventional delay circuit integral with electrical motor 318, re-energizes motor 318 thus automatically recocking the spring mechanism. The delay in re-energization of motor 318 after firing permits lead slug 306 to travel the full length of cable 308 before rewinding begins. Limit switch 320, when lead slug 306 is returned to the illustrated cocked position, also energizes the projectile loading mechanism for moving empty shell 46 from the firing position and moving a loaded shell 46 into firing position. Until cable 308 is retracted and lead slug 306 has returned to the "cocked" position, the projectile feeding mechanism cannot operate thus preventing jamming which would occur if sprocket assembly 90 were rotated while cable 308 or lead slug 306 were still in barrel 70 or empty shell 46.

It is also within the scope of this invention to include other means of transporting projectiles 49 to the firing position. For example, projectiles 49 might be transported by gravity positioning, by pneumatic tube positioning, or by any other device suitable for presenting a single projectile 49 in secure or locked firing position at the breech end of barrel 70.

For simplicity of illustration, many of the assembly and disassembly details such as wiring, screws, bolts, clips, hinges, locks, and the like are not shown in the food gun apparatus of FIGURES 1–22. However, the food gun apparatus there shown is designed to provide ready access to and removal of all parts by means of removable walls, panels, sections, and the like which also facilitate cleaning and maintenance of our food gun assembly as required. In any food handling or food-product handling device such as the food gun of this invention, it is highly advantageous to be able to thoroughly clean all parts exposed to food to prevent putrefaction of old food with accompanying unpleasant odor and insect attracting characteristics.

In the construction of the food gun device of this invention, materials are selected to provide a balance between strength, cost, corrosion resistance, weight, and workability characteristics. Most metal parts are preferably made from aluminum, but steel is usually used where high strength and wearing qualities require it. Aluminum parts are preferably anodized for appearance and to improve corrosion resistance. Steel parts are usually cadmium plated for corrosion and weathering resistance. Of course, where superior corrosion and structural characteristics are required, stainless steel is employed.

Our animal feeding method and food gun incorporate features most attractive to those responsible for the care of captive animals. Some of the more significant features include: (1) proper apportionment of food quantity to the animals; (2) assurance of sanitary and appropriate food for each animal; (3) flexibility as to including medicinal and therapeutic additives with food; (4) neatness and cleanliness of public feeding thus improving overall housekeeping; (5) positive control of direction, range, and trajectory of food projectiles thus reducing waste; and (6) a public attraction which provides maximum enjoyment of animal feeding with minimum of public inconvenience.

Various other changes and modifications are apparent from the description of this invention and further modifications and changes are intended to be within the scope of this invention as defined by the following claims.

We claim:
1. An animal feeding apparatus which comprises:
   support means;
   a plurality of projectiles containing animal comestible food;
   a barrel mounted on said support means for directionally aligning one of said food projectiles as it is ejected from said animal feeding apparatus, said barrel having a breech end and a muzzle end;
   propulsive means mounted on said support means for ejecting said food projectile through said barrel and out the muzzle end of said barrel;
   trigger means connected to said propulsive means for actuating said propulsive means; and
   food projectile feeding means mounted on said support means for supplying said food projectile in register with said breech end of said barrel and said propulsive means.

2. An animal feeding apparatus as described in claim 1 wherein said propulsive means comprises:
   pressured gas reservoir means;
   valve means having an inlet and an outlet for releasing a predetermined propulsive charge of pressured gas from said pressured gas reservoir means;
   first gas conduit means connecting said pressured gas reservoir means to said inlet of said valve means; and
   second gas conduit means connected at one end to said outlet of said valve means and at the other end fitting snugly against said loaded food projectile which is in register with said breech end of said barrel; and wherein said trigger means operates to open said valve means.

3. An animal feeding apparatus as described in claim 1 wherein said food projectile feeding means comprises a continuous belt loaded with said plurality of projectiles and adapted to the successive locating of food projectiles one by one to a position in register with said breech end of said barrel and said propulsive means after ejection of a food projectile by said propulsive means.

4. The apparatus of claim 3 including means to receive the deposit of coins, switch means responsive to the deposit of coins to activate said trigger means, means to limit the number of said projectiles delivered to said breech end and means responsive thereto to deactivate said trigger means.

5. The apparatus of claim 3 wherein said projectile feeding means also comprises a sprocket wheel rotatably mounted perpendicular to and in peripheral alignment with said breech end to feed said continuous belt loaded with said plurality of projectiles, means to deposit said projectiles between the peripheral sprockets of said wheel and means to rotate said wheel and deposit said projectiles into the breech end of said barrel.

6. An animal feeding apparatus as described in claim 1 wherein said barrel is movably mounted so that said barrel can be horizontally pivoted to obtain azimuth aiming and said barrel can be vertically tilted to obtain food projectile trajectory.

7. An animal feeding apparatus as described in claim 1 wherein said support means includes a food projectile storage container, said barrel being mounted on said support means above said food projectile storage container; and wherein said food projectile feeding means successively removes stored food projectiles from said food projectile storage container as required for ejection.

8. An animal feeding apparatus as described in claim 1 including said projectiles containing perishable comestible food and refrigeration means mounted on said support means for keeping said food projectiles cool prior to ejection of said food projectiles through said barrel.

9. An animal feeding apparatus as described in claim 1 wherein said food projectile feeding means includes control means for automatically causing said food projectiles to be supplied one by one by said food projectile feeding means to said breech end of said barrel, said control means being actuated by said trigger means.

10. An animal feeding apparatus as described in claim 1 wherein said food projectiles supplied by said food projectile feeding means are each transported within cylindrical open-end shells whose inside diameter is substantially the same as the inside diameter of said barrel, said cylindrical open-end shells being positioned successively in register between said propulsive means and said breech end of said barrel.

11. An animal feeding apparatus as described in claim 1 wherein said propulsive means comprises:
   an accelerating tube having a closed end with a central opening and an open end whose longitudinal center axis is substantially in alignment with the longitudinal axis of said barrel, said accelerating tube having an internal diameter substantially the same as the internal diameter of said barrel and the open end of said accelerating tube being positioned so as to permit an open-end cylinder loaded with a comestible food projectile to be snugly positioned between said open end of said accelerating tube and said breech end of said barrel;
   spring biasing means positioned in said accelerating tube for providing the propulsive force to propel said food projectile through said barrel;
   a cylindrical propelling weight having a slightly smaller outside diameter than the inside diameter of said accelerating tube and the inside diameter of said open-end cylinder, said weight being positioned in said accelerating tube between said spring biasing means and said open end of said accelerating tube when said spring biasing means is compressed;
   cable means attached to said cylindrical propelling weight and passing centrally through said accelerating tube and through said central opening in said closed end of said accelerating tube;
   drum winding means mounted on said support means for winding said cable means thereon so as to compress said spring biasing means; and
   drum release means for releasing said drum winding means so as to allow said spring biasing means to expand, said drum release means being actuated by said trigger means.

12. The apparatus of claim 1 wherein said breech end of said barrel and said food projectile feeding means are enclosed with a protective housing.

13. A device for feeding animals which comprises:
   a plurality of projectiles containing perishable animal comestible food;
   support means which includes a container for storage of said plurality of food projectiles located in the lower portion of said support means;
   a barrel movably mounted on said support means above said container so that said barrel can be horizontally pivoted to obtain azimuth aiming and can be vertically tilted to obtain food projectile trajectory, for directionally aligning a food projectile as it is ejected from said animal feeding apparatus, said barrel having a breech end and a muzzle end;

propulsive means mounted on said support means for ejecting a food projectile through said barrel and out said muzzle end of said barrel, said propulsive means comprising pressured gas reservoir means, valve means having an inlet and an outlet for releasing a predetermined propulsive charge of pressured gas from said pressured gas reservoir means, first gas conduit means connecting said pressured gas reservoir means to said inlet of said valve means, and second gas conduit means connected at one end to said outlet of said valve means and at the other end fitting snugly against said loaded food projectile which is in register with said breech end of said barrel;

trigger means connected to said valve means for opening said valve means to release said propulsive charge of pressured gas;

food projectile feeding means mounted on said support means which comprises a continuous belt loaded with said food projectiles and adapted to successively locate said food projectiles one by one to a position in register with said breech end of said barrel and said propulsive means after ejection of a food projectile by said propulsive means, said continuous belt comprising a plurality of linked cylindrical open-end shells whose inside diameter is substantially the same as the inside diameter of said barrel, said cylindrical open-end shells containing said food projectiles and being positioned successively in register between said propulsive means and said breech end of said barrel, said food projectile feeding means adapted to successively remove stored food projectiles from said food projectile storage container as required for ejection;

control means for automatically causing said food projectiles to be supplied one by one by said food projectile feeding means to said breech end of said barrel, said control means being actuated by said trigger means; and refrigeration means mounted on said support means for keeping said food projectiles cool prior to ejection of said food projectiles through said barrel.

14. The apparatus of claim 13 wherein said breech end of said barrel and said food projectile feeding means are encased within a protective housing communicating with said container to permit said refrigeration means to cool said projectiles in said breech end and said housing.

15. An animal feeding apparatus which comprises:
container means for retaining an animal comestible food in a shaped comestible food projectile form;
comestible food projectile propelling means;
loading means attached to said comestible food projectile propelling means for positioning said container means in a position for ejection of said animal comestible food projectile therefrom;
aiming means attached to said comestible food projectile propelling means for aiming said comestible food projectile propelling means towards an animal; and
ejection means for ejecting said comestible food projectile from said food projectile propelling means at a velocity and trajectory sufficient to carry said animal comestible food projectile to said animal.

References Cited by the Examiner

UNITED STATES PATENTS

| | | | |
|---|---|---|---|
| 94,119 | 8/69 | Kirk | 124—14 |
| 1,278,216 | 9/18 | Reid. | |
| 2,189,213 | 2/40 | MacDonell | 119—51 |
| 2,502,909 | 4/50 | Wick et al. | 124—45 X |
| 2,578,863 | 12/51 | Trelease | 119—51 |
| 2,619,935 | 12/52 | Reynolds et al. | 119—51 |
| 2,635,599 | 4/53 | Wells | 124—13 |
| 2,652,821 | 9/53 | Fitch | 124—13 |
| 2,758,566 | 8/56 | Talbott | 119—51 |
| 2,801,610 | 8/57 | Wallace et al. | 119—51 |
| 2,818,682 | 1/58 | Finn. | |
| 2,929,355 | 3/60 | Paquette | 119—51 |
| 3,069,809 | 12/62 | Simmons | 47—57.5 |

OTHER REFERENCES

Engineering News-Record (pp. 58 and 63 cited), April 9, 1959.

RICHARD C. PINKHAM, *Primary Examiner.*

ALDRICH F. MEDBERRY, *Examiner.*